US007826987B2

(12) United States Patent
Aikawa

(10) Patent No.: US 7,826,987 B2
(45) Date of Patent: Nov. 2, 2010

(54) METHOD FOR DETECTING A CONDITION OF ENGINE OIL

(75) Inventor: Koichiro Aikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 119 days.

(21) Appl. No.: 11/826,869

(22) Filed: Jul. 19, 2007

(65) Prior Publication Data

US 2008/0027661 A1 Jan. 31, 2008

(30) Foreign Application Priority Data

Jul. 28, 2006 (JP) ............................ 2006-206700

(51) Int. Cl.
*G01M 19/00* (2006.01)

(52) U.S. Cl. .................................... 702/50; 123/196 R

(58) Field of Classification Search .................. 702/50; 73/117.2, 113; 701/1, 123; 340/438, 450.3; 123/568.11, 572, 568.28, 196 R
See application file for complete search history.

(56) References Cited

U.S. PATENT DOCUMENTS 4,558,681 A * 12/1985 Mookerjee ............. 123/568.11
5,750,887 A * 5/1998 Schricker ................... 73/117.3
5,914,890 A * 6/1999 Sarangapani et al. ........ 702/182
5,987,976 A * 11/1999 Sarangapani ............... 73/117.2
6,253,601 B1 7/2001 Wang et al.
2004/0093931 A1 5/2004 Carlstrom
2005/0268884 A1* 12/2005 Yokoyama .................. 123/299

FOREIGN PATENT DOCUMENTS

JP 2002-276326 A 9/2002
JP 2004-150947 A 5/2004
JP 2006/274931 A 10/2006
WO WO 00/29817 A 5/2000

* cited by examiner

*Primary Examiner*—Drew A Dunn
*Assistant Examiner*—Hien X Vo
(74) *Attorney, Agent, or Firm*—Arent Fox LLP

(57) ABSTRACT

Provided is a method for detecting a condition of engine oil that allows the progress of degradation of engine oil to be more accurately determined without incurring any significant cost. In a method for detecting a state of engine oil by defining a degradation index that changes with a progress in degradation of the engine oil that lubricates an internal combustion engine and determining a progress of the degradation of the engine oil according to the degradation index, a value related to a concentration of blow-by gas that flows into a crankcase of the engine is computed, and the degradation index is computed according to the computed value related to a concentration of blow-by gas that flows into a crankcase of the engine. The degradation index may consist of a total base number of the engine oil, and the concentration of blow-by gas that flows into a crankcase of the engine may consist of a NOx concentration.

17 Claims, 8 Drawing Sheets

METHOD FOR DETECTING A CONDITION OF ENGINE OIL

TECHNICAL FIELD

The present invention relates to a method for detecting a condition of engine oil that is used for lubricating an internal combustion engine of a motor vehicle and evaluating the extent of degradation of the engine oil.

BACKGROUND OF THE INVENTION

It is essential for maintaining the performance of an internal combustion engine to change the engine oil that lubricates various parts of the engine from time to time. The interval for changing the engine oil is determined according to the travel distance and period of the use of the vehicle, and the interval for changing engine oil recommended by the manufacturer is set somewhat shorter than is actually necessary to provide a certain safety margin. However, the actual advance of engine oil degradation is so much dependent on the operating condition of the vehicle that changing the engine oil according to the recommended distance and time period of use may result in replacing and discarding the engine oil which is still able to provide an adequate lubricating performance.

Such a conventional practice of changing engine oil means a waste of valuable natural resources, and there has been a need to more accurately determine the interval for changing the engine oil. Commonly assigned U.S. Pat. No. 6,449,538 (Kubo et al.) discloses a method for determining the progress of engine oil degradation according to the engine oil temperature estimated from the cooling water temperature and the condition of cooling water circulation. The entire contents of this patent are hereby incorporated in this application by reference.

As an oil degradation index is known the total base number (TBN) which is a measure of the remaining amount of additives included in the engine oil to keep it clean. As the remaining amount of additives decreases, the capability of the oil to curb the generation of sludge diminishes. Therefore, this number is considered to accurately reflect the practical service life of the engine oil. As a method for estimating the TBN on a real-time basis is known a method based on the measurement of the electric property of the engine oil. See U.S. Pat. No. 7,038,459 (Wakabayashi). The entire contents of this patent are hereby incorporated in this application by reference.

However, the engine oil is stored in an oil pan that communicates with a crankcase into which a large amount of NOx flows depending on the operating condition of the engine. Therefore, the method disclosed in U.S. Pat. No. 6,449,538 that takes into account only the oil temperature may not accurately evaluate the advance of engine oil degradation as it does not account for the influences from the contact with NOx.

The method proposed in U.S. Pat. No. 7,038,459 estimates the acidity or basicity of the engine oil solely from the voltage or static capacitance across a pair of electrodes that are immersed in the engine oil, and the need for a pair of electrodes that are immersed in the engine oil makes this method too expensive and too unreliable to be adopted in vehicles for the general public.

BRIEF SUMMARY OF THE INVENTION

In view of such problems of the prior art, a primary object of the present invention is to provide a method for detecting a condition of engine oil that allows the progress of degradation of engine oil to be more accurately determined substantially without incurring any additional costs.

To achieve such an object, the present invention provides a method for detecting a condition of engine oil, comprising: defining a degradation index that changes with a progress in degradation of the engine oil that lubricates an internal combustion engine; computing a value related to a concentration of blow-by gas that flows into a crankcase of the engine; and computing the degradation index according to the computed value related to a concentration of blow-by gas that flows into a crankcase of the engine.

The step of computing the degradation index may comprise computing a change rate of the degradation index according to the computed value related to a concentration of blow-by gas that flows into a crankcase of the engine, and computing the degradation index by integrating the computed change rate of the degradation index.

Thus, according to the present invention, because how the concentration of NOx in the blow-by gas that flows from combustion chambers to a crankcase affects the progress of degradation of the engine oil is experimentally known, when the TBN is used as an index of the progress of degradation of the engine oil, by computing the index from the computed value of the NOx concentration, the condition of the engine oil can be detected at a high precision.

The degradation index indicates a progress of the degradation of the engine oil, and can be used as data for determining the timing of changing the oil. Also, as the degradation index affects the operating property of the engine, the degradation index can be used as data for the fuel injection control of the engine to optimize the operating condition of the engine in dependence on the degradation index.

In particular, because the progress of engine oil degradation depends on the oil temperature, if the computed degradation index or the computed rate of degradation index is modified according to the detected engine oil temperature, the accuracy in evaluating the degradation of the engine oil can be improved even further by modifying the TBN depending on the oil temperature.

Preferably, the degradation index consists of a total base number of the engine oil. The concentration of blow-by gas that flows into a crankcase of the engine may consist of a NOx concentration. The NOx concentration may be computed from at least one of a crankshaft rotational speed, load, valve lift and valve timing of the engine. The NOx concentration may be modified by at least one of a relative humidity, ignition timing and fuel injection.

Furthermore, according to a certain aspect of the present invention, as it is known that the NOx concentration in the crankcase depends on the crankshaft rotational speed, load, valve lift and valve timing of the engine, the relationship with such factors may be measured and stored in the memory of an electronic control unit in the form of a map so that the NOx concentration in the crankcase may be more accurately estimated by looking up the map. According to another aspect of the present invention, as it is known that the NOx concentration in the crankcase depends on the relative humidity, ignition timing and fuel injection, the NOx concentration in the crankcase may be more accurately estimated by modifying the estimated value depending on such factors.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
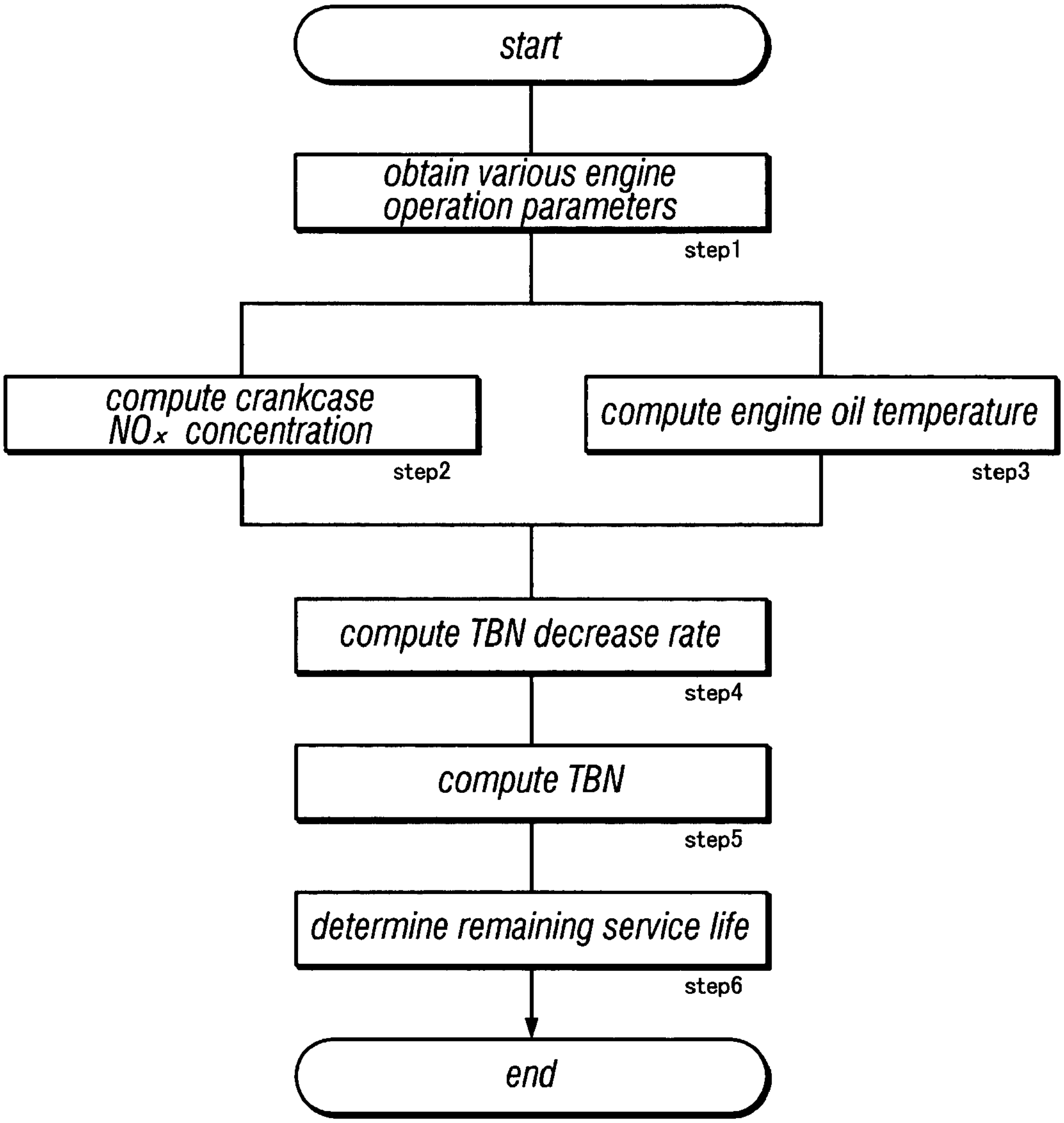
FIG. 1 is a process flowchart for determining the extent of deterioration of engine oil according to the present invention.

Now the control flow of the present invention is described in the following with reference to FIG. 1.

(Step 1: Obtaining Various Engine Parameters)

First of all, various engine parameters such as the crankshaft rotational speed, load (intake negative pressure, throttle valve opening and fuel injection), valve lift, valve timing, ignition timing and cooling water temperature, that change in dependence on the operating condition of the engine, as well as the intake (atmospheric) temperature and relative humidity, are obtained. These parameters are obtained from various sensors that are commonly used in current motor vehicles.

(Step 2: Compute NOx Concentration in Crankcase)

Figure 2:
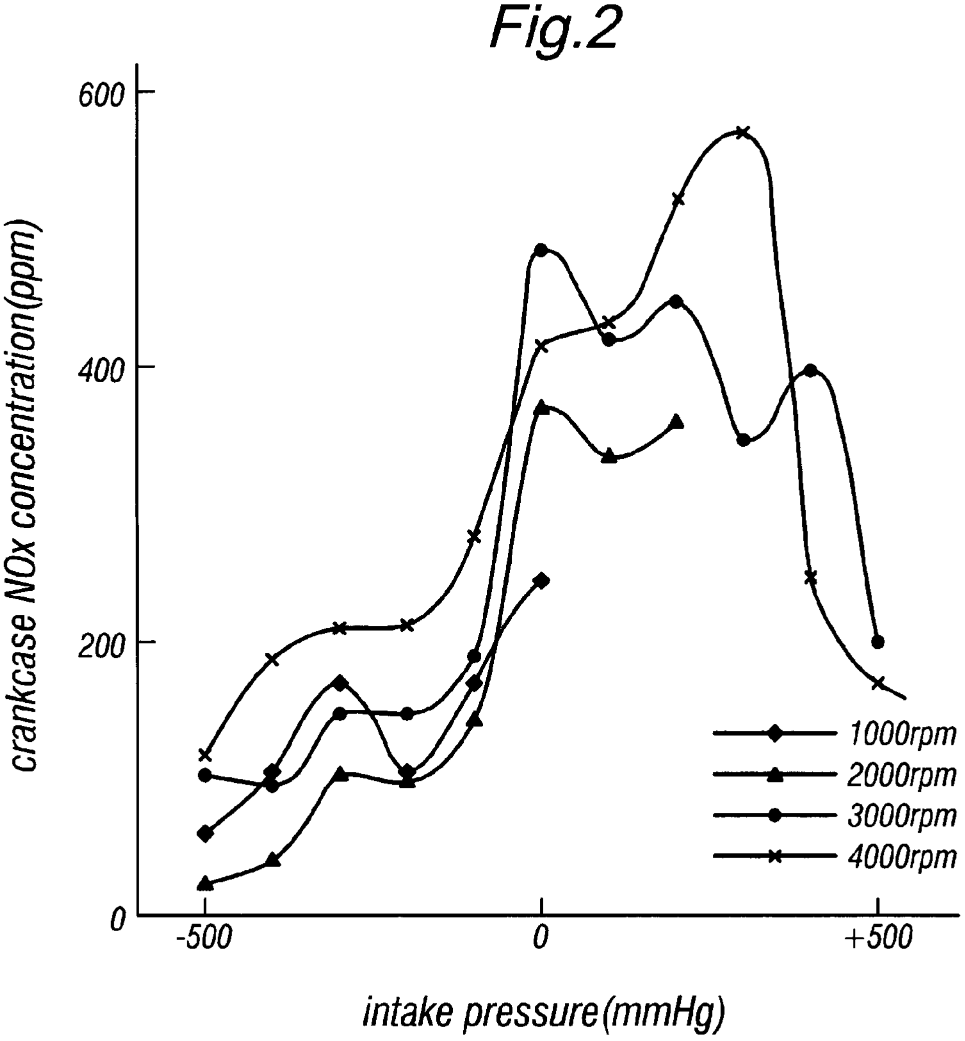
FIG. 2 is a graph showing an exemplary table for computing the NOx concentration in a crankcase.

The NOx concentration in the crankcase that significantly affects the degradation of the engine oil is computed from the various parameters that were obtained in step 1. The NOx concentration in the crankcase can be obtained, for instance, by the technique described below:

1. The NOx concentration is measured by using a gas analyzing device while variously changing the crankshaft rotational speed, intake pressure or throttle vale opening, valve lift and valve timing, and a table is prepared from the obtained data that describes the relationship of the NOx concentration with these parameters that indicate the operating condition of the engine (see FIG. 2). This data is stored in the memory of an electronic control unit.

Figure 3:
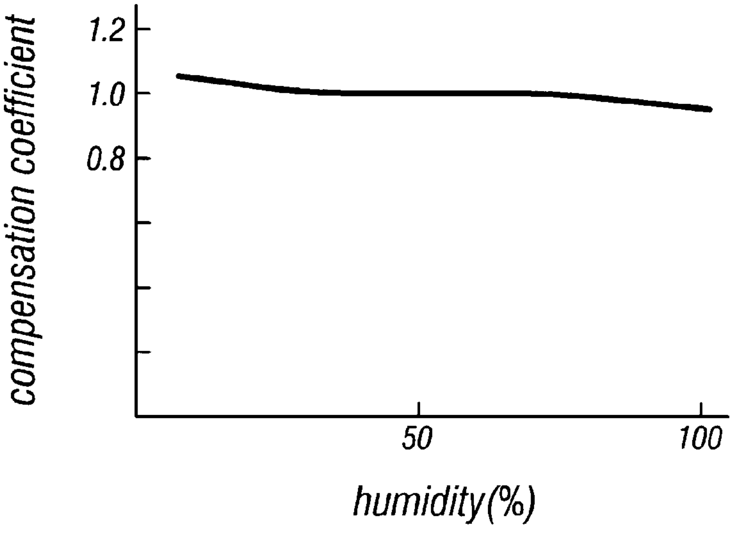
FIG. 3 is a graph showing an exemplary table of a compensation coefficient for humidity.
Figure 4:
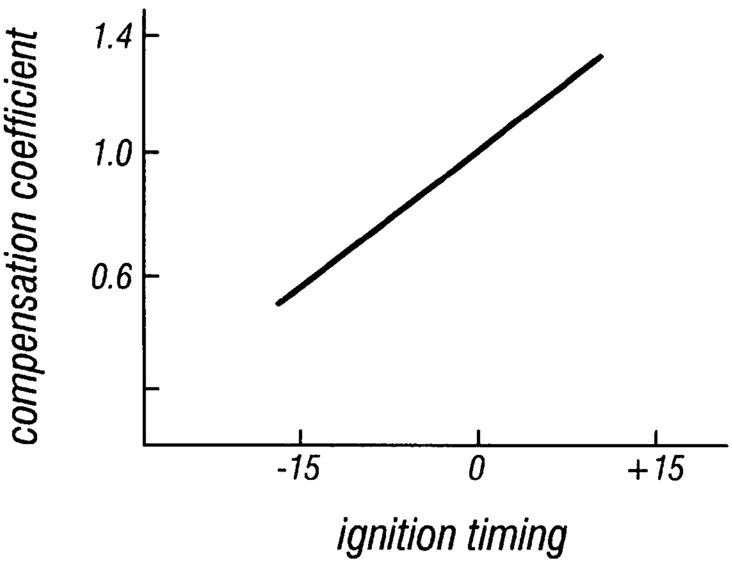
FIG. 4 is a graph showing an exemplary table of a compensation coefficient for ignition timing.
Figure 5:
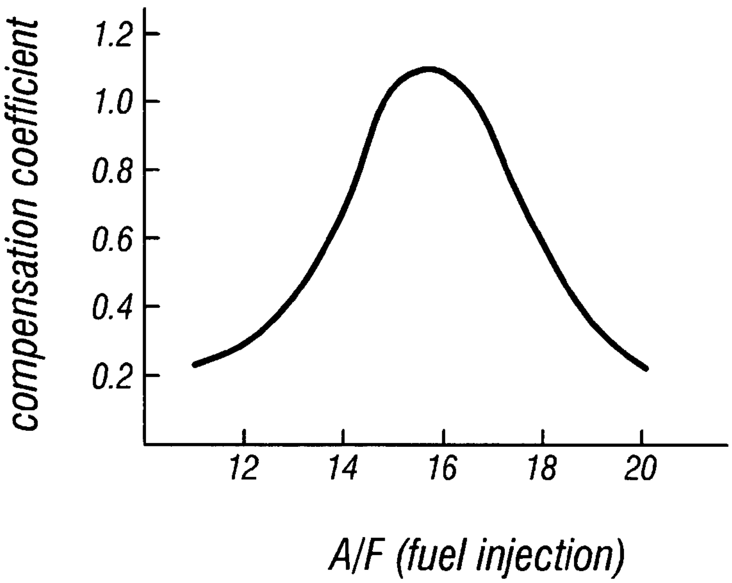
FIG. 5 is a graph showing an exemplary table of a compensation coefficient for fuel injection.

2. Because the NOx concentration changes with the relative humidity, ignition timing and fuel injection, compensation coefficient tables that account for the influences of such factors are prepared in advance (see FIGS. 3 to 5), and are stored in the memory of the electronic control unit.

Figure 6:
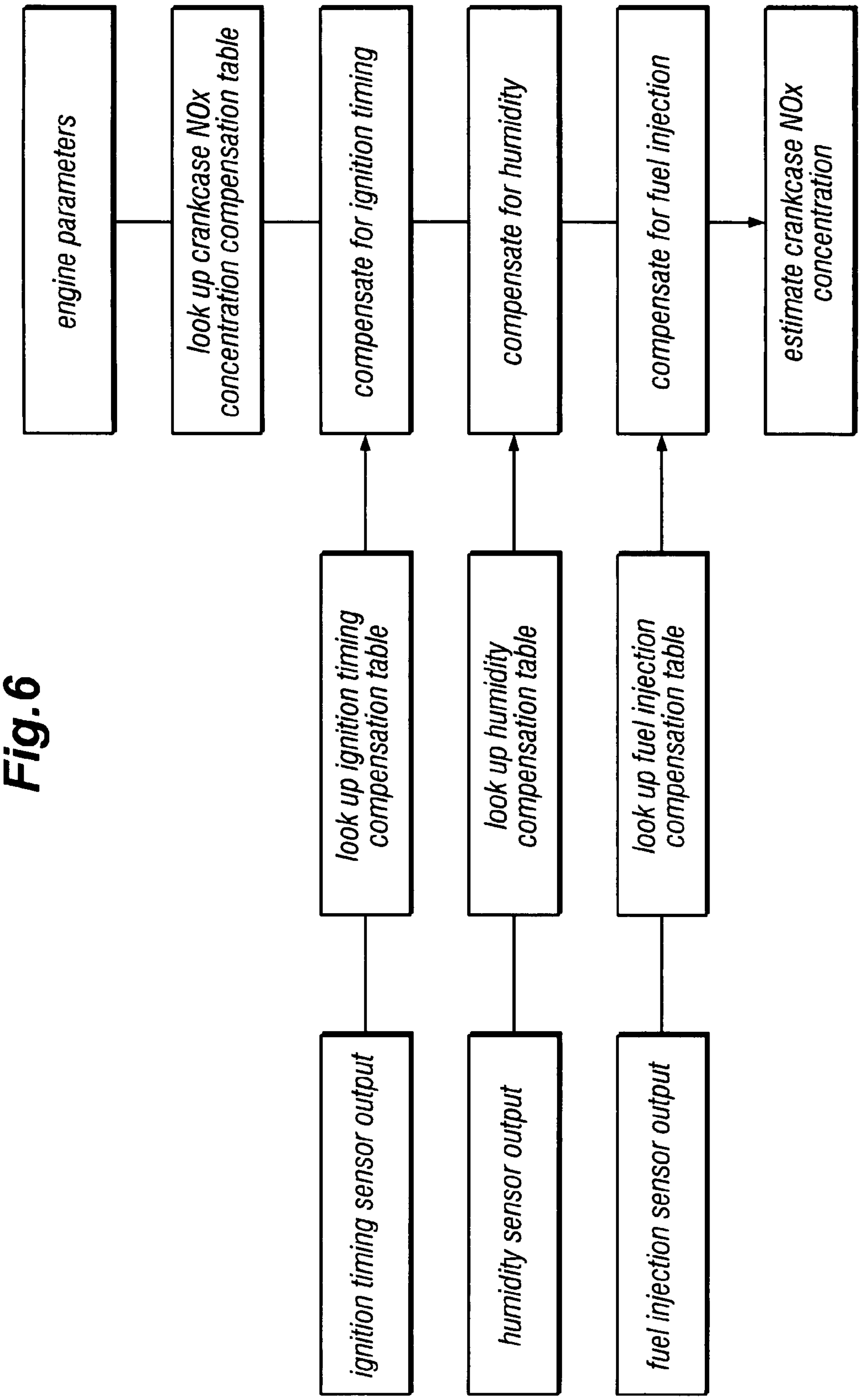
FIG. 6 is a process flowchart for computing the NOx concentration in a crankcase.

3. The crankshaft rotational speed, intake pressure or throttle vale opening, valve lift and valve timing are measured on a real time basis by using various sensors during the operation of the vehicle, and the NOx concentration at each time point is estimated by looking up the table against the obtained data. If necessary, at the same time, the NOx concentration is modified in dependence on the actually measured values of the relative humidity, ignition timing and fuel injection by using the corresponding compensation coefficient tables (see FIG. 6).

(Step 3: Computing Engine Oil Temperature)

The engine oil temperature is either computed from the various engine parameters obtained in step 1 or actually measured by using a thermocouple placed in an appropriate part of the engine. The engine oil temperature can be computed from the output of a cooling water temperature and the state of a thermostat valve by using a known technique (see U.S. Pat. No. 6,449,538).

(Step 4: Computing TBN Decrease Rate)

The decrease rate of the TBN is computed from the crankcase NOx concentration obtained in step 2 and the engine oil temperature obtained in step 3 by using the following equation.

$$d[TBN]/dt=k_1[TBN]^2+k_2[TBN][NOx\ \text{concentration}]^2+k_3 \quad (1)$$

How Equation (1) was derived is described in the following. The decrease in the TBN when the engine oil is subjected to heat is attributed to various causes, but there has not been any conclusive explanation. Therefore, the decrease rate of the TBN was measured in a laboratory with regard to a number of oil samples while applying heat and blowing air to and into the oil, and the TBN decrease rate was formulated into a formula by analyzing the data using a differential method.

Figure 7:
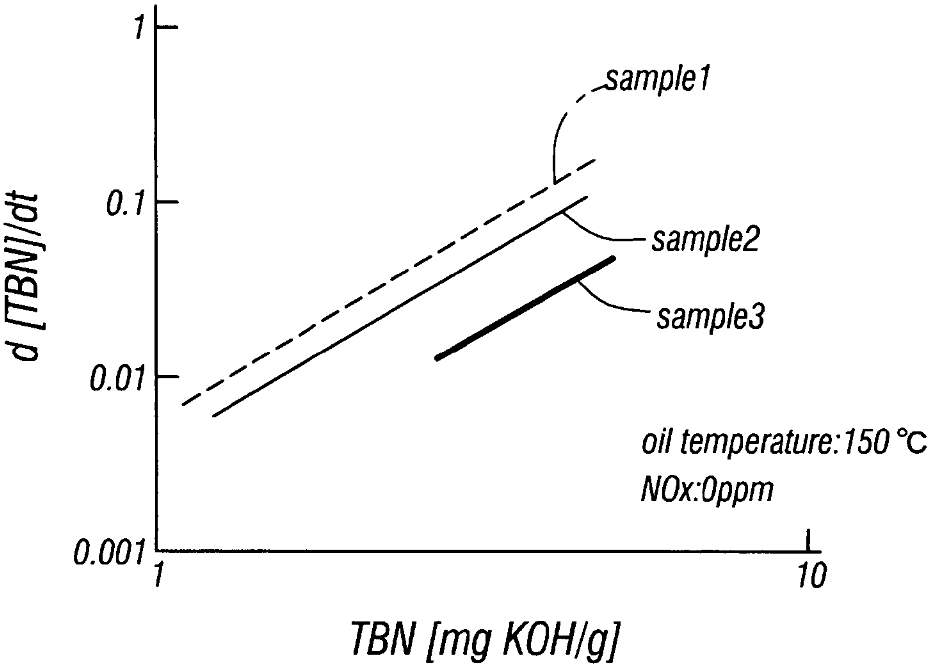
FIG. 7 is a graph showing the reaction rate of the TBN.

The order of the chemical reaction rate regarding the TBN was estimated to be 2 from this experiment (FIG. 7). By thus assuming that the order of the chemical reaction related to the TBN is 2, the chemical reaction rate formula is given as follows:

$$-(d[TBN]_{thermal}/dt)=k_1[TBN]^2 \quad (2)$$

Figure 8:
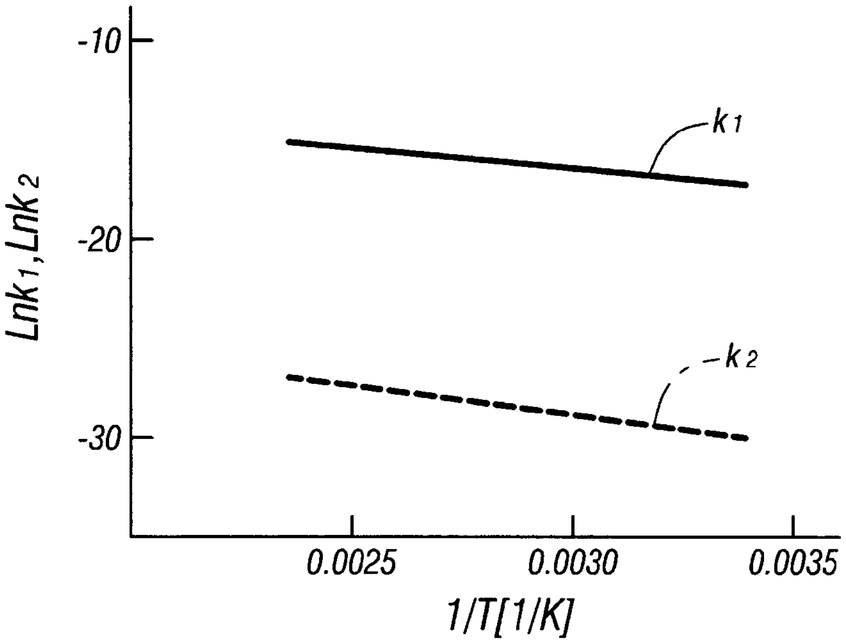
FIG. 8 is a graph showing the Arrhenius plots for the coefficients $k_1$ and $k_2$.

When the dependency of the decrease rate of the TBN on temperature was measured and the decrease rate coefficient $k_1$ was Arrhenius plotted, a linearity was demonstrated as shown in FIG. 8, and it was concluded that the decrease rate of the TBN can be considered as being of an Arrhenius type.

Figure 9:
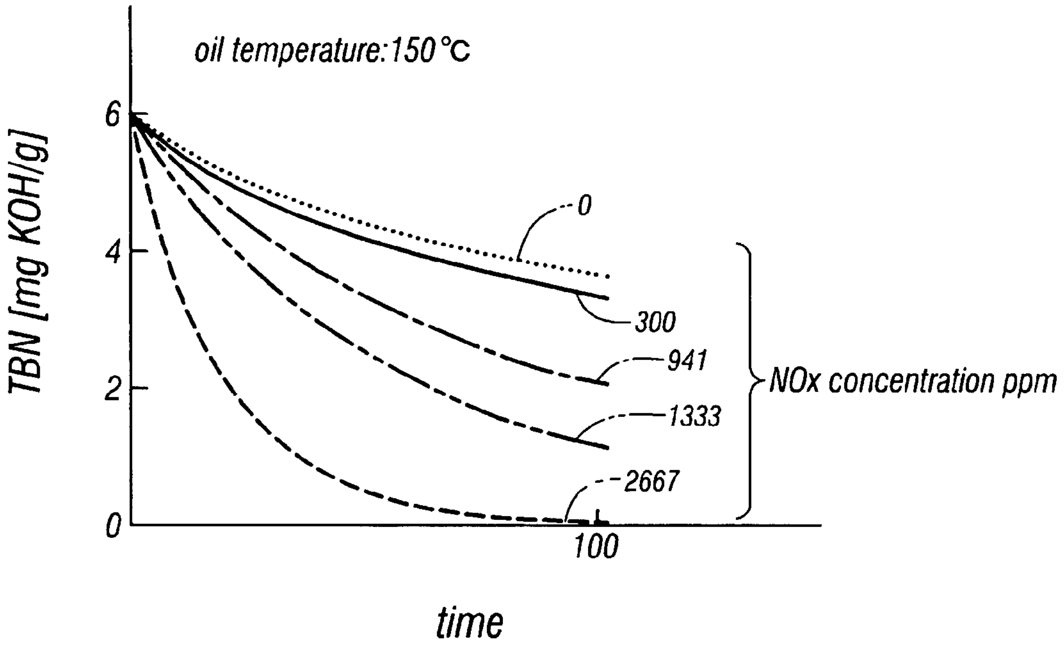
FIG. 9 is a graph showing the relationship between the NOx concentration and TBN decrease rate.

Now is considered the relationship between the NOx concentration and the decrease rate of the TBN. It was found that, as shown in FIG. 9, the higher the NOx concentration is, the greater the decrease rate of the TBN is (the sooner the engine oil deteriorates). However, the TBN decreases over time even without contacting NOx, it is appropriate to set the NOx reaction rate term in Equation (2) as an independent term. If the NOx reaction rate term is given as $A_{nox}$ it can be assumed that:

$$-(d[TBN]_{thermal,\,NOx}/dt)=k_1[TBN]^2+A_{nox} \quad (3)$$

Figure 10:
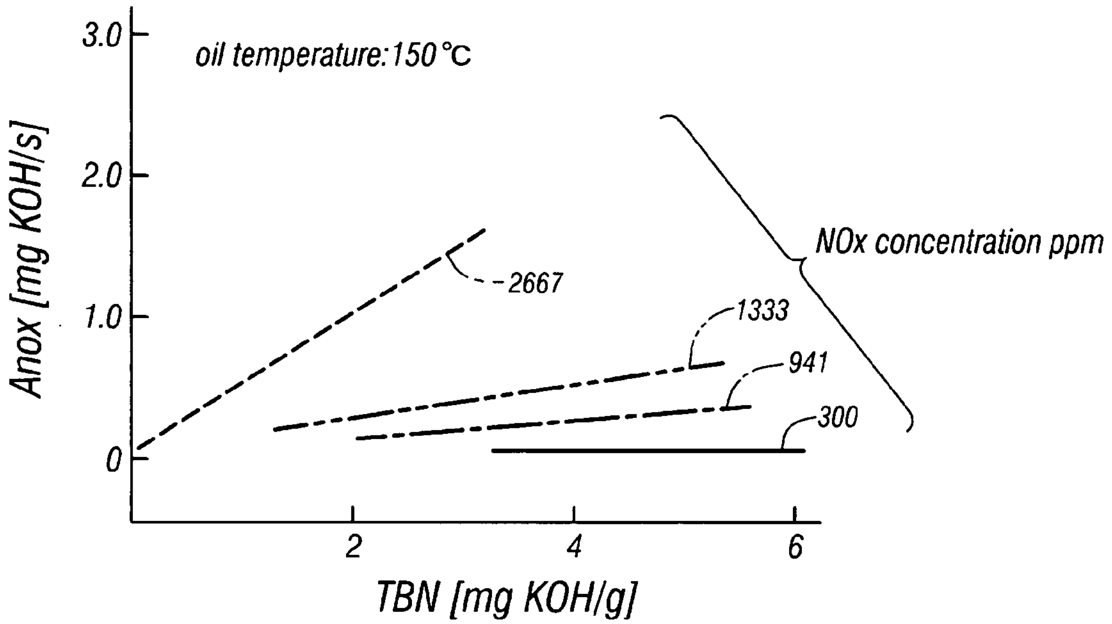
FIG. 10 is a graph showing the relationship between the $A_{nox}$, NOx concentration and TBN.
Figure 11:
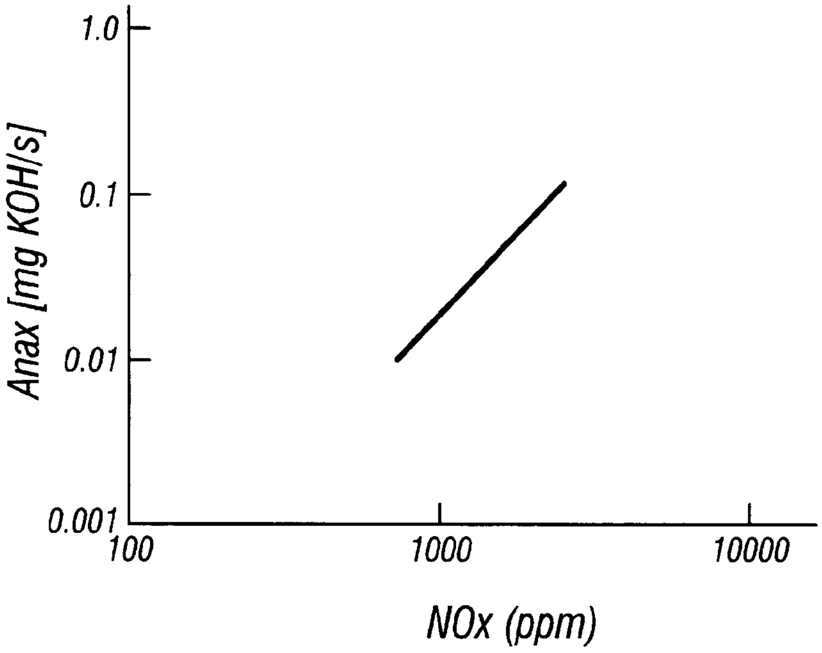
FIG. 11 is a graph showing the relationship between the $A_{nox}$ and NOx.

$A_{nox}$ in Equation (3) can be obtained experimentally by conducting experiments at various NOx concentration levels and finding the differentials of the reaction rate. As shown in FIG. 10, $A_{nox}$ is substantially proportional to the TBN, and changes with the NOx concentration. As shown in FIG. 11, $A_{nox}$ is proportional to the square of the NOx concentration.

From the foregoing, the following equation can be obtained.

$$A_{nox}=k_2[\text{TBN}][\text{NOx concentration}]^2 \quad (4)$$

$A_{nox}$ also depends on temperature, and the coefficient $k_2$ is linear in an Arrhenius plot as was the case with the coefficient k1 (FIG. 8).

By formulating the TBN decrease rate from the foregoing considerations, Equation (1) can be obtained. In Equation (1), $k_3$ is a compensation coefficient for increasing the precision of the computation and does not depend on the TBN or NOx concentration.

(Step 5: Computing TBN)

TBN is now obtained by integrating the TBN decrease rate obtained by Equation (1).

$$TBN=1/\{k_1t+(1/[TBN_0])\}+k_2[NOx\ \text{concentration}]^2t+k_3t \quad (5)$$

where the first term is a basic term, the second term is a compensation term for the NOx concentration and the third term is a compensation term for heat. An approximate solution can be obtained by experimentally determining these coefficients.

(Step 6: Determining Remaining Service Life)

Figure 12:
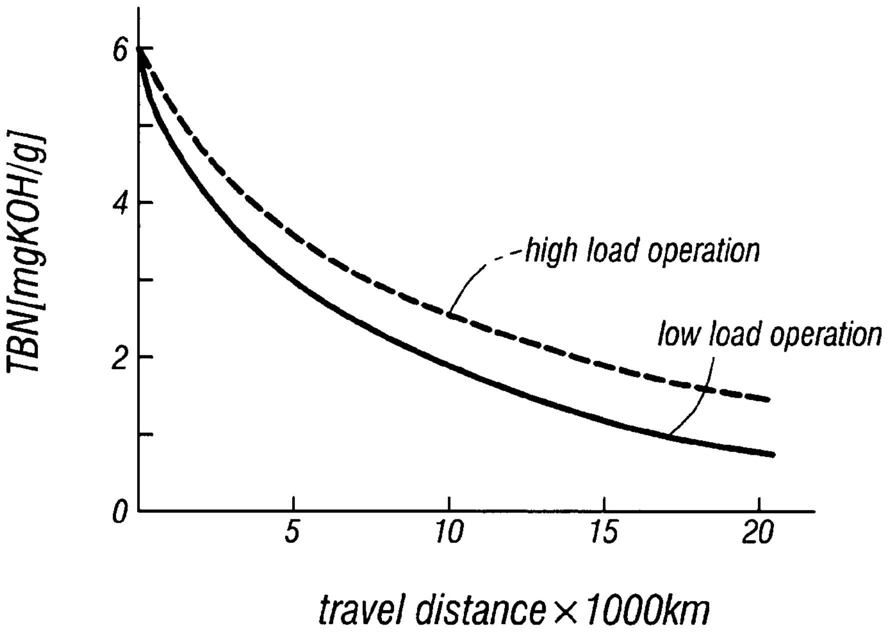
FIG. 12 is a graph showing the relationship between the travel distance and TBN.
Figure 13:
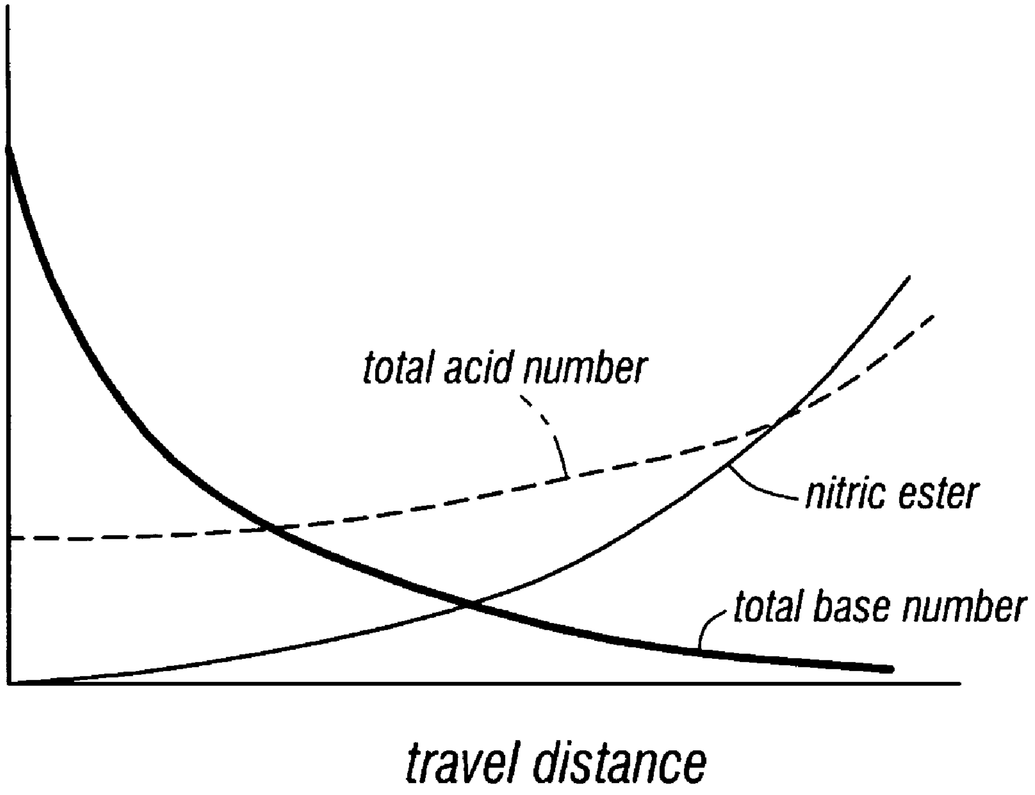
FIG. 13 is a graph showing the relationship between the travel distance and various oil degradation indices.

The TBN is closely related to the effect of the cleaning agents contained in the engine oil, and it is known that the generation of sludge becomes significant when the TBN drops below a certain limit. It is also known that the decrease rate of the TBN much depends on the operating condition of the engine (see FIG. 12). Therefore, by knowing the TBN, it is possible to determine the remaining service life of the engine oil more accurately as compared with the conventional method based solely on the travel distance of the vehicle.

In the foregoing embodiment, the TBN was used as an index for determining the extent of deterioration of engine oil. However, it is also known that other values such as the total acid number and the accumulation of nitric ester have certain relationships with the travel distance, and such values may also be used as indices for determining the progress of deterioration of engine oil.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A method for detecting a condition of engine oil, comprising:

defining a degradation index that changes with a progress in degradation of the engine oil that lubricates an internal combustion engine;

computing a value related to a concentration of blow-by gas that flows into a crankcase of the engine; and computing the degradation index according to the computed value related to a concentration of blow-by gas that flows into a crankcase of the engine.

2. The method for detecting a condition of engine oil according to claim 1, further comprising detecting a temperature of the engine oil, the computed degradation index being modified according to the detected engine oil temperature.

3. The method for detecting a condition of engine oil according to claim 1, wherein computing the degradation index comprises computing a change rate of the degradation index according to the computed value related to a concentration of blow-by gas that flows into a crankcase of the engine, and computing the degradation index by integrating the computed change rate of the degradation index.

4. The method for detecting a condition of engine oil according to claim 1, further comprising detecting a temperature of the engine oil, the computed change rate of the degradation index being modified according to the detected engine oil temperature.

5. The method for detecting a condition of engine oil according to claim 1, wherein the degradation index consists of a total base number of the engine oil.

6. A method for detecting a condition of engine oil, comprising:

defining a degradation index that changes with a progress in degradation of the engine oil that lubricates an internal combustion engine;

computing a value related to a concentration of blow-by gas that flows into a crankcase of the engine; and computing the degradation index according to the computed value related to a concentration of blow-by gas that flows into a crankcase of the engine;

wherein the concentration of blow-by gas that flows into a crankcase of the engine consists of a NOx concentration.

7. The method for detecting a condition of engine oil according to claim 6, wherein the NOx concentration is computed from at least one of a crankshaft rotational speed, load, valve lift and valve timing of the engine.

8. The method for detecting a condition of engine oil according to claim 6, wherein the NOx concentration is modified by at least one of a relative humidity, ignition timing and fuel injection.

9. The method for detecting a condition of engine oil according to claim 1, further comprising determining a progress of the degradation of the engine oil according to the computed degradation index.

10. A method for detecting a condition of engine oil, comprising:

defining a degradation index that changes with a progress in degradation of the engine oil that lubricates an internal combustion engine;

computing a value related to a concentration of blow-by gas that flows into a crankcase of the engine;

computing a change rate of the degradation index according to the computed value related to a concentration of blow-by gas that flows into a crankcase of the engine; and computing the degradation index by integrating the computed change rate of the degradation index.

11. The method for detecting a condition of engine oil according to claim 10, further comprising detecting a temperature of the engine oil, the computed degradation index being modified according to the detected engine oil temperature.

12. The method for detecting a condition of engine oil according to claim 10, further comprising detecting a temperature of the engine oil, the computed change rate of the degradation index being modified according to the detected engine oil temperature.

13. The method for detecting a condition of engine oil according to claim 10, wherein the degradation index consists of a total base number of the engine oil.

14. The method for detecting a condition of engine oil according to claim 10, wherein the concentration of blow-by gas that flows into a crankcase of the engine consists of a NOx concentration.

15. The method for detecting a condition of engine oil according to claim 14, wherein the NOx concentration is computed from at least one of a crankshaft rotational speed, load, valve lift and valve timing of the engine.

16. The method for detecting a condition of engine oil according to claim 14, wherein the NOx concentration is modified by at least one of a relative humidity, ignition timing and fuel injection.

17. The method for detecting a condition of engine oil according to claim 10, further comprising determining a progress of the degradation of the engine oil according to the computed degradation index.

* * * * *